March 12, 1957 A. A. BERNARD 2,785,285
COMPOSITE WELDING ELECTRODE
Filed March 18, 1953
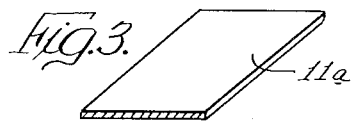
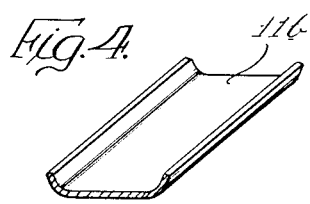 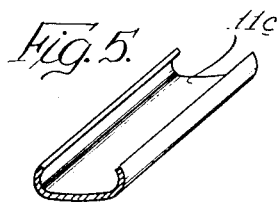 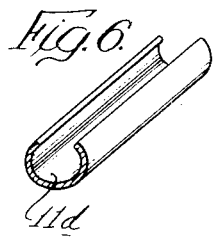
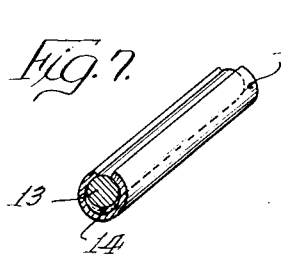 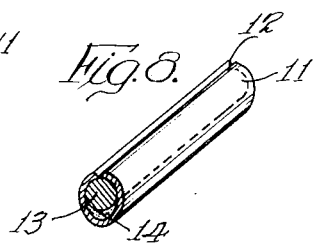 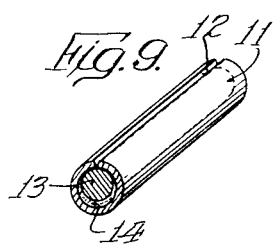
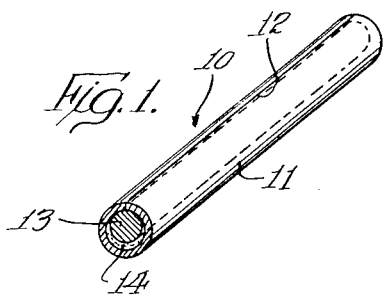 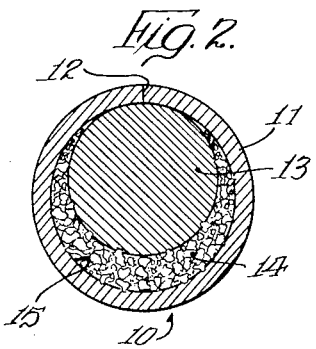
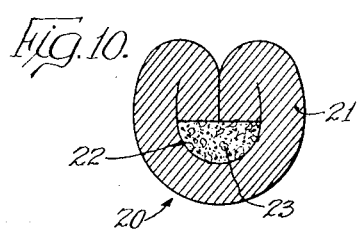
INVENTOR.
Arthur A. Bernard
BY
Mason, Kolehmainen, Rathburn & Wyss
Attys.

United States Patent Office 2,785,285
Patented Mar. 12, 1957

2,785,285

COMPOSITE WELDING ELECTRODE

Arthur A. Bernard, Chicago, Ill., assignor to National Cylinder Gas Company, Chicago, Ill., a corporation of Delaware Application March 18, 1953, Serial No. 343,097

4 Claims. (Cl. 219—146)

The present invention relates to a welding electrode, and, more particularly, to a composite welding electrode for use as a filler metal in a welding operation or a source of material in a hard surfacing operation as well as a source of material for a metal spraying operation. More particularly, the present invention is concerned with a welding electrode having the appearance and outer characteristics of a bare rod electrode, but which electrode acts as a vehicle for various special process powders or materials.

In electric welding the welding arc acts as a vehicle for transferring molten metal from a welding electrode to a base metal or material upon which or in connection with which a welding operation is being performed. During such an electric welding operation the arc is surrounded by a gas or vapor which is generated by the heat of the arc, thus providing a protective shield, although somewhat ineffective, against the effect of the ambient atmosphere. To increase the effectiveness of this arc shield, many arrangements have been employed and suggested. The most common and extensively used arrangement involves coating the welding wire with a suitable flux. Such flux coated rods are at least to some extent satisfactory for welding when short lengths of welding rod are used, but numerous problems arise when it is desired to use a coated electrode in a continuous welding process where the welding electrode must be in the form of a continuous wire of some sort capable of having the welding current transferred to its cross section.

In the operation of an arc welding system, an arc is first struck by short circuiting the electrode to the work which liberates enough heat to produce the ordinary ions and electrons necessary to maintain a welding arc by providing a conductive path between the electrode and the work. While the arc generates such an extraordinarily high temperature that no compounds can exist within it, the area surrounding it must be protected from reaction with oxygen, nitrogen and hydrogen from ambient sources.

It is readily apparent that any metal transfer process such as occurs in welding, metal spraying or hard surfacing, may be considered analogous to an electric arc furnace steel making operation. In steel making, aluminum, ferro-silicon and ferro-manganese are added just prior to pouring, to control the oxygen content and thus indirectly the iron oxide-carbon reaction which evolves carbon monoxide gas which becomes a common source of porosity. While iron oxide serves a useful purpose in steel making for refining and improving its fluidity, its presence is varied between limits in order to attain the desired density. This is equally true in the metal transfer processes, particularly welding. Iron oxide in these cases also improves fluidity and metal transfer characteristics, while the oxides of certain materials formed by reaction with the contained iron oxide become more electronically emissive than the metal itself. It must be understood, however, that in the metal transfer processes the metal, before solidification, must be completely deoxidized to obtain maximum final density and satisfactory physical and chemical properties. However, the carbon monoxide is not the only source of porosity in either steel making or in the metal transfer operation, as hydrogen may be generated from atmospheric moisture and from moisture occluded in rust and other sources, while nitrogen also may be absorbed from atmospheric air. It is for this reason that degasifiers must also be added to the metal to attain maximum density. It has been found that certain such degasifiers under certain conditions can also re-establish an alternating current arc during its current-zero period as well as render the direct current arc more stable. This is accomplished by virtue of their low work function or lower heat energy necessary to release electrons from their surfaces. Therefore, when the arc is first established, these materials, which may fortuitously also be degasifiers, arrive at a certain minimum temperature and electrons are emitted which improve the operation of the arc by acting as current carriers. Furthermore, in order to lend strength and stability to the arc, additional materials may be added to the ambient arc atmosphere which form highly electrically conductive vapors by their ability to ionize at low voltages.

The various materials which can be used in the metal transfer processes, particularly the welding process, as gas absorbers or getters, may include zirconium, columbium, tantalum, titanium, thorium, barium, calcium and the like. These materials are for the most part also good thermal electron emitters. Good deoxidizers are those materials which react avidly with oxygen to form thermally stable oxides. Aluminum, titanium, manganese, silicon, calcium and the like are examples of these materials.

It is obvious that all of these materials are extremely sensitive to the presence of gases at elevated temperatures, so it is imperative that they be protected from this set of conditions until they are within the arc zone where their peculiar properties are desirable. Numerous attempts have been made by the present inventor to supply one or more of these materials completely protected in a continuous length of electrode which would have the appearance of a bare rod continuous welding electrode. Some of these attempts produced satisfactory results but had certain shortcomings and, hence, are, at least at present, not considered as satisfactory as the preferred embodiment described in detail hereinafter. They are mentioned herein primarily better to illustrate the important features of the present invention, and many of them fall within the scope of the claims covering the present invention.

The logical suggestion would be to incorporate the gas absorptive and electron emissive material in the chemical composition of a single metallic rod. Unfortunately, a rod or ingot of this composition would be very difficult and costly to fabricate into a rod. The resulting rod would be very hard, and it would be difficult to coil the same into a supply spool which could be used and handled conveniently in automatic welding machines. Furthermore, the alloying of the material would, of course, mean that its concentration and availability would be materially reduced by dilution in the parent metal. Consequently, this proposal has been found to be entirely unsatisfactory.

Attempts have also been made to enclose the process material or powder which is gas absorptive and electron emissive within an annular space in a metal sheath containing a central core rod. While this construction provides a convenient way of containing the process material in a rod without reducing the efficacy thereof, it may present a problem of proper current transfer. Such gas absorptive and electron emissive material is not as good a conductor of electricity even in solid form as are metals such as iron and steel, and, when comminuted or powdered, its resistance is increased exponentially. With this arrangement the metallic sheath becomes the primary current carrier, and, being of necessity of relatively small cross section, will preheat to the point of incipient fusion and might wilt after passing through the current transfer shoes in an automatic arc welding head. The process material within the sheath and the core rod could then receive only a small amount of conducted heat from the sheath and could enter the molten weld pool in a relatively cool condition. From a metallurgical standpoint, this would result in a somewhat sluggish weld pool resulting in decreased physical properties with respect to density, strength and mutual alloying of the electrode and weld metal. If the electrode is being used for hard surfacing, it will result in poor adhesion of the matrix to the base metal as well as an irregular deposit surface. In view of the possible poorer current conduction, the current densities likely to occur with this type of arrangement may be considerably less than would be the case with a bare rod electrode.

Another method of incorporating the gas absorptive and electron emissive process material in a welding rod which has been given consideration, comprises incorporating the process material in a central opening in a steel ingot. This construction does have the advantage of providing good current transfer to the process material, but, obviously, the heat necessary to permit rolling and drawing may unduly heat the process material in the presence of air to destroy or at least decrease its chemical activity with respect to gas absorption.

Still other methods of incorporating the process material in electrodes have comprised putting the material in powdered form within a tube having sufficient wall thickness, or placing the material in a tube within an ingot mold and casting the ingot around the tube, or securing the material to the surface of the electrode. All of these methods have certain shortcomings which might be merely in the high cost of manufacture or in a less satisfactory product. Also, some of these methods are satisfactory for laboratory use, but do not lend themselves to commercial production.

It would be desirable, therefore, to provide a welding electrode having the external appearance of a bare wire electrode which incorporates therein the necessary process material in a manner so that its efficacy as a gas absorptive material or an electron emissive material is in no way impaired and wherein good current transfer to all parts of the electrode is possible.

Accordingly, it is an object of the present invention to provide a new and improved welding electrode capable of use for automatic arc welding, hard surfacing or metal spraying.

It is another object of the present invention to provide a welding electrode having a continuous supply along the length thereof of gas absorptive, electron emissive and ionizable chemicals for the maintenance and stability of the arc and to impart density to the metallic deposit during a welding operation.

Still another object of the present invention resides in a welding electrode which is a vehicle designed to provide a continuous supply of chemical elements for imparting improved fluidity and metal transfer characteristics to the molten metal derived from the welding electrode during operation of the welding process.

It is a further object to provide a composite electrode including a sheath and core rod which provide a continuous supply of filler metal of a composition which is metallurgically compatible with a base metal in a welding operation.

Still another object resides in the provision of an electrode for use in hard surfacing which serves as a vehicle for a continuous supply of hard materials which, in the functioning of the hard surfacing process, are embedded in a matrix whose composition is determined to a great extent by the type of metal used in the welding electrode.

It is a further object of the present invention to provide a composite rod for use in metal spraying and hard surfacing, which composite rod is a vehicle for a continuous supply of special materials designed to produce various composition coatings having highly satisfactory wear, heat resistant and corrosion resistant characteristics.

It is another object of the present invention to provide a composite electrode comprising an outer sheath and an inner core, together with a supply of comminuted gas absorptive and electron emissive material within the sheath, which composite electrode is sufficiently flexible and structurally strong to be used as a bare metallic electrode without danger of opening a seam in the sheath or losing any of the comminuted material contained within the sheath.

It is another object of the present invention to provide a composite welding electrode including an outer metal sheath and an inner metal core which is capable of conducting large electrode currents over its entire cross section, whereby all parts of the electrode are heated in a relatively uniform manner so that all components enter the weld pool in a welding operation at substantially the same temperature.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings, in which:

Fig. 1 is a perspective view of a section of a welding electrode embodying the present invention, which welding electrode may have a length of hundreds of feet so as to be usable in a continuous welding process;

Fig. 2 is an enlarged cross-sectional view of the welding electrode of Fig. 1;

Fig. 3 is a perspective view of the sheath portion of the welding electrode of Fig. 1 in its initial condition before being fabricated into a sheath;

Figs. 4, 5 and 6 are perspective views of the sheath of Fig. 1 showing the different shapes assumed by this sheath during the process of manufacture thereof;

Figs. 7, 8 and 9 are perspective views somewhat similar to Fig. 1 showing successive stages in the manufacture of the electrode of Fig. 1 with respect to shaping the sheath, positioning the core wire and the process material included within the sheath; and Fig. 10 is a sectional view similar to Fig. 2 illustrating a modification of the present invention.

Although the present invention is primarily concerned with providing a welding electrode having the outer appearance and characteristics of bare wire which also includes a continuous source of a gas absorptive and electron emissive material, it is illustrated as a composite electrode especially adapted for use in electric arc welding. As illustrated, this electrode comprises an outer sheath having disposed therein a rodlike metallic conductor which has a smaller diameter than the internal diameter of the sheath. Preferably this rodlike conductor is in intimate physical engagement with the sheath along the seam of the sheath primarily to caulk the seam and, secondarily, to make continuous electrical contact along the length of the rod and the inside of the sheath. The remainder of the space between the rod and the sheath, which is of crescent shaped cross section, is filled with gas absorptive as well as electron emissive material which may comprise a getter material such as a zirconium compound in powdered or comminuted form. In some cases it may also be desirable to apply a protective film to the exterior of the electrode which might be an organic coating or an oxide or phosphate coating.

Referring now to the drawings, and particularly to Figs. 1 and 2 thereof, there is disclosed a welding electrode generally designated by the reference numeral 10, which welding electrode has the outer appearance of a bare metal rod and which may have different external diameters depending upon the particular application thereof. It might, for example, be what is termed a 3/16 inch electrode, meaning that it has an external diameter of 3/16 of an inch. The electrode 10, having the appearance of a bare metal rod, is preferably a continuous length of material which may be disposed in the form of a coil several hundred feet in length for use in a continuous welding process. An improved welding process with which the present electrode is especially effective is disclosed and claimed in the copending application of Arthur A. Bernard, Serial No. 424,977, filed April 22, 1954, assigned to the same assignee as the present application. The electrode 10 comprises an outer sheath 11 for a particular application preferably formed from a strip of mild steel such as is often sold on the market as SAE 1010. Obviously, it may be made of any different material also. The sheath 11 is illustrated as being formed from flat strip material designated as 11a in Fig. 3 of the drawings, and for a 3/16 inch electrode might comprise a mild steel strip twenty thousandths of an inch in thickness and having a width very slightly in excess of 1/2 inch. It will be apparent that when the sheath 11 of the welding electrode 10 is formed of flat strip material 11a, there will be a seam at the point where the edges of the strip 11a come together. This seam is designated by the reference numeral 12 in Figs. 1 and 2 of the drawings.

In accordance with the present invention, there is contained within the sheath 11 a suitable rod or core 13 of desired material depending upon the particular welding operation. This core wire 13 might be formed of mild steel for certain applications; and preferably for a 3/16 inch welding electrode 10 the core wire 13 may have a diameter of 1/8 of an inch. In accordance with the present invention, the core wire 13 is preferably in intimate physical engagement with the sheath 11 along the seam 12 so as effectively to caulk the seam 12 and also to provide electrical contact between the sheath and the core wire.

For the purpose of maintaining the core wire 13, which is smaller in diameter than the internal diameter of the sheath 11, in intimate electrical contact with the sheath 11 so as to seal the seam 12, the crescent-shaped cross section between the core wire and the sheath is filled with a suitable powder or granulated material generally designated by the reference numeral 14. Actually, since it is desirable to have a continuous supply of gas absorptive and electron emissive material for improved welding operation, the crescent-shaped space within the core wire, which might be designated by the reference numeral 15, is filled with a powdered or granular gettering material which also is electron emissive. Such a material might contain columbium, tantalum or the like, but preferably comprises a zirconium compound, which is found to be especially effective as an agent for absorbing deleterious gases and as an arc stabilizer in that it is a good electron emissive material. Zirconium is found in minerals in combination with silicon. A material comprising, by weight, about 36.5% zirconium, 50% silicon, 11.5% iron, and about 2% of certain other materials such as aluminum, chromium and carbon, may be prepared from the natural product. Such process material may be purchased on the market as a ferro-silicon zirconium compound. Preferably this material 14 is comminuted so as to have sizes from dust to particles capable of passing through a 40 mesh screen. In a copending Bernard application Serial No. 343,098, filed March 18, 1953, assigned to the same assignee as the present application, there is disclosed a method and apparatus for manufacturing the electrode 10 of the present invention. In order to properly carry out the method of manufacturing the electrode 10 set forth in this copending application, it is essential that the particles of zirconium compound or other material included in the space 15 be free from static charges. Accordingly, the process material powder is preferably produced by a crushing mechanism which will not subject the particles to static charges. Such crushing mechanism is disclosed and claimed in copending Bernard application Serial No. 343,099, filed March 18, 1953, and also assigned to the same assignee as the present application.

For the particular dimensions of the sheath and core wire discussed above, it will be apparent that the crescent-shaped space 15 at its widest point will have a radial dimension of the order of twenty thousandths of an inch. Since the largest particles might have a maximum dimension of almost forty thousandths of an inch, it will be observed that such particles will actually tend to be embedded slightly in the sheath 11 as well as the core wire 13, thereby locking the particles in position and assuring uniform distribution of the process material 14 along the length of the electrode 10.

It will be understood that the amount of process material 14 contained within the chamber 15 may be varied by varying the size of the core wire 13. It is also possible to include a granular filler material such as powdered iron with the process material, thereby providing even greater flexibility in controlling the amount of effective process material contained in the chamber 15. It has been found that the effective process material should comprise between 1/2% and 6% of the total weight of electrode 10. Obviously, by controlling the quantity of filler material which may be powdered metal of the same type as the core wire, the desired percentage of effective process material may be accurately controlled without varying the size of the core wire. Thus, great flexibility of design is afforded.

As was stated above, the effectiveness of the zirconium powder is likely to be impaired if subjected to high heat while subjected to air or deleterious materials or gases such as hydrogen, nitrogen or hydrocarbons prior to its use during the welding process. In accordance with the method of manufacturing the electrode disclosed and claimed in the copending Bernard application, Serial No. 343,098, now U. S. Patent 2,733,866, granted February 7, 1956 no heat of any note is applied to the process powder 14, and, hence its effectiveness as a gas absorptive material is at a maximum. Since the effectiveness of the zirconium is greatly reduced when subjected to hydrogen, it is important that during the manufacture of the welding electrode 10 the use of oils which might come in contact with either the sheath or core wire be eliminated, since oils are hydrocarbons and contain substantial quantities of hydrogen which would reduce the effectiveness of the zirconium as a gas absorptive material.

It may be desirable under certain situations to provide a protective film of some sort on the exterior of the electrode 10. This protective film should be a rust preventative and something which seals the seam 12 against the entrance of moisture. This film, however, should in no way affect the other characteristics of the electrode. The electrode of the present invention has been successfully used without any film. In many cases it is unnecessary to use such an exterior film or coating. It will be apparent that numerous films might be employed. One film or coating successfully employed comprises stearic acid, which is preferably applied to the electrode as a vapor so as to provide a thin protective film which does not enter the seam 12. This stearic acid has been found to be desirable, since it seems to improve arc operation and the use of such coating does not harm the hands of the welder if it should come off onto his skin. Obviously, numerous other organic materials might be employed, and it might also be desirable to employ other protective coatings such as oxides or phosphates.

Although the process of manufacturing the core wire 13 of the present invention is fully disclosed and claimed in the above-mentioned copending Bernard application, Serial No. 343,098, it is believed that a brief description of successive steps in the process may be helpful in better understanding the present invention. In manufacturing the electrode 10, there is employed the sheath material comprising the flat strip 11a, the core wire 13, and the granular process material 14. In successive stages the flat strip 11a is preferably formed into a trough shape so as to be capable of receiving the core wire 13 and the process powder 14. In Fig. 4 the edges of the strip 11a have been bent upwardly to form a somewhat shallow U-shaped configuration, and in Fig. 4 this strip material is designated by the reference numeral 11b. In Fig. 5 more deformation has occurred to the strip which is now designated by the reference numeral 11c, and in Fig. 6 the strip designated by the reference numeral 11d is almost in the form of a sheath with a sufficiently wide opening to permit the insertion of the core wire 13. Fig. 7 shows the sheath 11 with the core wire 13 and process material 14 disposed therein. There is a substantial gap between the edges of the original strip 11a which must be closed to form the fairly tight seam 12 referred to above. In Fig. 8 the sheath 11 has been deformed to a somewhat oval shape with the long axis of the oval passing through the seam. In Fig. 9 the sheath 11 is also of oval shape, but this time the long axis is prependicular to the short axis going through the seam, so that upon a subsequent compressing operation at the ends of the long oval the seam 12 will be tightly closed as shown in Figs. 1 and 2. The core wire 13 is fed into the sheath 11 so as to lay over the process powder 14, and, when finally completed, the electrode 10 is circular so that it may be fed satisfactorily through conventional welding mechanisms.

It will be apparent that, although a specific example has been described in which the sheath 11 and core wire 13 are formed of mild steel and the process material comprises granulated zirconium compound, the composition of these various portions of the electrode may be varied to change the performance and accomplish many purposes in the transfer of metal for welding, hard surfacing or metal spraying. Actually, any of the three principal elements of construction, namely, the outer sheath 11, the core wire 13, or the granulated process material 14 can be varied in composition.

With the present invention it will be appreciated that there has been provided a welding electrode which has all the outer characteristics of a bare metallic rod, but which provides a vehicle for special process powders or the like, and which are contained within the electrode in a manner so that even though the process materials are deleteriously affected by the application of heat or the contact with hydrogen, no deleterious effect occurs. It will also be appreciated that the pressure of the core wire 13 effectively seals or caulks the compartment 15 for the process powder. Additionally, the volume of the compartment 15 may be changed to accommodate larger or smaller amounts of the process material 14 merely by changing the diameter of the core rod 13. The process powder 14, moreover, is so highly compressed within the chamber 15 that it becomes more electrically conductive than it otherwise would be, and, additionally, is prevented from excessive movement during handling. This is especially true because many of the larger particles of the process material 14 are actually partially embedded in the walls of the sheath or the core wire, or both.

During a welding operation, due to the intimate contact between the core wire 13 and the sheath 11 along the entire length thereof, both the core wire and the sheath are excellent conductors of electricity, and even the conducting characteristic of the powder 14 is improved by virtue of its compressed condition. This welding electrode can be used in automatic feeding mechanisms and brought to the desired melting point by the electric arc action. Obviously, the welding electrode can also be used in connection with other metal transfer processes employing gaseous fuels. The welding electrode 10 is particularly adapted, however, for electric arc welding and is capable of carrying large electrical currents over its entire cross section. Thus, all parts thereof, and particularly the process material 14 as well as the core rod 13, are heated more uniformly than heretofore, with the result that there is efficient mixing if the constituents are immiscible, or alloying of all miscible components of the composite electrode. Such efficient mixing or alloying is necessary and desirable to obtain the optimum advantages of the welding process described and claimed in the aforesaid copending Bernard application, Serial No. 424,977.

In Fig. 10 of the drawings there has been illustrated a modification of the present invention. The electrode illustrated in Figure 10 is designated by the reference numeral 20 and comprises a sheath portion 21 which may originally be in the form of a flat strip which is formed through a series of successive forming operations into the shape shown in Fig. 10. It will be apparent that the exterior configuration of the electrode 20 is substantially cylindrical and will have the outer characteristics of a bare wire electrode. Moreover, there is defined within the interior of the electrode 20 a chamber 22 for receiving therein a quantity of process material 23 of the type described above. The electrode 20 may be manufactured by means of a continuous process, and provides a satisfactory welding electrode. Obviously, it does not provide the flexibility that is provided by the electrode 10 described above. In the electrode 10 the volume of the material may be varied in a simple manner by changing the size of the core wire 13. Likewise, greater flexibility is provided by the electrode 10 with respect to choice of materials, since the core wire and sheath may each be made of different materials. Likewise, with the electrode 20 the volume of the process material 23 cannot readily be changed without modifying the apparatus which manufactures the electrode 20. In view of the disclosure of Fig. 10 and the description included above, the use and operation thereof will readily be apparent to those skilled in the art.

While there has been illustrated and described a preferred embodiment of the present invention, it will be appreciated that numerous changes and modifications will occur to those skilled in the art, and it is aimed in the appended claims to cover all such changes and modifications as fall within the true spirit and scope of the present invention.

What is claimed as new and desired to be secured by Letters Patent of the United States is:

1. A composite welding electrode comprising a circumferentially closed elongated metal sheath having an elongated cavity therein, said cavity extending longitudinally of said sheath, a granular process material disposed within and filling said cavity, said process material being so constituted that certain granules thereof have a maximum dimension exceeding the radial cross-sectional dimension of said cavity at its widest point, said certain granules being partially embedded in said sheath.

2. A welding electrode as set forth in claim 1 wherein a solid metal rod is positioned along one side of said cavity in said sheath so as to provide a crescent shaped cavity in which said process material is disposed.

3. A welding electrode as set forth in claim 1 wherein said dimension of said certain granules is twice the size of said dimension of said cavity.

4. A composite arc welding electrode which has all the outer characteristics of a bare wire welding electrode comprising a seamed tubular housing of circular cross section, a circular cross-section core wire of smaller diameter than the internal diameter of said housing disposed within said housing and touching said housing along the seam thereof whereby said housing and core wire define a chamber having a crescent shaped cross section within said housing, and a compressed granular chemically reactive material comprising about 36.5% zirconium, 50% silicon, 11.5% iron, with the remainder including one of the group consisting of aluminum, chromium and carbon, said reactive material being disposed within said chamber to supply a constant source of process material during an arc welding operation to improve the weldment density and stability of the arc.

References Cited in the file of this patent

UNITED STATES PATENTS

| | | |
|---|---|---|
| 1,387,157 | Jones | Aug. 9, 1921 |
| 1,501,266 | Brace | July 15, 1924 |
| 1,629,748 | Stoody | May 24, 1927 |
| 1,640,859 | Stoody | Aug. 30, 1927 |
| 1,942,364 | Rood | Jan. 2, 1934 |
| 2,694,763 | Muller | Nov. 16, 1954 |